United States Patent
Garcia-Diaz et al.

(10) Patent No.: US 12,416,094 B2
(45) Date of Patent: Sep. 16, 2025

(54) LOCALIZED ELECTROREFINING OF METALS AND ALLOYS

(71) Applicant: BATTELLE SAVANNAH RIVER ALLIANCE, LLC, Aiken, SC (US)

(72) Inventors: Brenda L. Garcia-Diaz, Aiken, SC (US); Christopher S. Dandeneau, Augusta, GA (US); Dale A. Hitchcock, Aiken, SC (US)

(73) Assignee: Battelle Savannah River Alliance LLC, Aiken, SC (US)

( * ) Notice: Subject to any disclaimer, the term of this patent is extended or adjusted under 35 U.S.C. 154(b) by 437 days.

(21) Appl. No.: 18/097,731

(22) Filed: Jan. 17, 2023

(65) Prior Publication Data

US 2023/0235477 A1 Jul. 27, 2023

Related U.S. Application Data

(60) Provisional application No. 63/303,333, filed on Jan. 26, 2022.

(51) Int. Cl.
| | |
|---|---|
| *C25C 3/00* | (2006.01) |
| *C06B 33/02* | (2006.01) |
| *C25C 3/32* | (2006.01) |
| *C25C 7/00* | (2006.01) |
| *C25F 3/14* | (2006.01) |

(52) U.S. Cl.
CPC ............... *C25F 3/14* (2013.01); *C06B 33/02* (2013.01); *C25C 3/32* (2013.01); *C25C 7/005* (2013.01)

(58) Field of Classification Search
CPC ............. C25C 3/32; C25C 7/005; C25F 3/14
See application file for complete search history.

(56) References Cited

U.S. PATENT DOCUMENTS

| | | |
|---|---|---|
| 2,923,670 A | 2/1960 | Bjorklund et al. |
| 3,516,868 A | 6/1970 | Nee et al. |
| 3,518,125 A | 6/1970 | Fischbach |
| 4,880,506 A | 11/1989 | Ackerman et al. |
| 5,582,706 A | 12/1996 | Grantham et al. |
| 7,097,747 B1 | 8/2006 | Herceg et al. |

(Continued)

FOREIGN PATENT DOCUMENTS

| | | |
|---|---|---|
| GB | 1 422 859 A | 1/1976 |
| KR | 20140129692 A | 11/2014 |

(Continued)

OTHER PUBLICATIONS

Magdalena Michalak, "Localized generation of the catalytic metallic nanostructures and pH mapping with scanning electrochemical microscopy", PhD thesis, Institute of Physical Chemistry, Warsaw, Poland, Dec. 2019 147 pages.

(Continued)

*Primary Examiner* — Zulmariam Mendez
(74) *Attorney, Agent, or Firm* — Dority & Manning, P.A.

(57) ABSTRACT

Methods and systems for use in targeted removal of metals from a substrate via electrorefining are described. A self-propagating reaction is initiated by use of a thermite to reach high temperatures sufficient to induce localized melting of a salt situated on a metal or alloy substrate. Using a power supply connected to an electrode assembly, an electrorefining reaction capable of generating significant localized corrosion of the substrate is produced.

17 Claims, 5 Drawing Sheets

(56) References Cited

U.S. PATENT DOCUMENTS

2003/0194602 A1\* 10/2003 Daoud ................. H01M 50/119
                                                                    429/188
2014/0013982 A1   1/2014 Meir et al.
2018/0080899 A1   3/2018 Simpson et al.
2022/0025535 A1\*  1/2022 Loop ........................ C25B 1/02

FOREIGN PATENT DOCUMENTS

KR    20210095478 A    8/2021
RU        2603844 C1   12/2016

OTHER PUBLICATIONS

FY 20 LDRD Annual Report, "Localized Electrorefining", dated Mar. 11, 2021, 8 pages.

\* cited by examiner

| Reactants | $T_{ad}$ (K) Metal Product: Liquid Oxide Product: Liquid | $T_{ad}$ (K) Metal Product: Liquid-Gas Oxide Product: Liquid | $T_{ad}$ (K)* Metal Product: Liquid-Gas Oxide Product: Liquid | Percent Difference (%) |
|---|---|---|---|---|
| 2Al-3CuO | 4555 | 2924 | 2843 | 2.8 |
| 2Al-3NiO | 3081 | 3045 | 3187 | 1.6 |
| 2Al-3CoO | 3390 | 3246 | 3201 | 1.4 |
| 2Al-3AgO | 5882 | 3239 | 3253 | 0.4 |
| 2Al-Fe$_2$O$_3$ | 3405 | 3047 | 3135 | 2.8 |
| 8Al-3Fe$_3$O$_4$ | 3239 | 3095 | 3135 | 1.3 |
| 4Al-3SnO$_2$ | 3799 | 2764 | 2876 | 4.0 |

* S.H. Fischer et al. SAND-98-1176C, Sandia National Laboratory, Albuquerque, NM (1998)

LOCALIZED ELECTROREFINING OF METALS AND ALLOYS

CROSS REFERENCE TO RELATED APPLICATION

This application claims filing benefit of U.S. Provisional Patent Application Ser. No. 63/303,333 having a filing date of Jan. 26, 2022, which is incorporated herein by reference for all purposes.

STATEMENT REGARDING FEDERALLY SPONSORED RESEARCH OR DEVELOPMENT

This invention was made with government support under Contract No. 89303321OEM000080 awarded by the U.S. Department of Energy. The government has certain rights in the invention.

BACKGROUND

Cladding on nuclear fuel must be resistant to oxidation/corrosion from the surrounding environment and thus, Zr and iron-based alloys have been employed in such applications. However, removal of cladding is necessary for nuclear fuel analysis and reprocessing, and these corrosion barriers make it extremely difficult to access to the underlying nuclear fuel for such purposes.

Current technologies for the removal of metals/alloys such as present in nuclear fuel claddings include chemical dissolution and mechanical removal or breaching. Unfortunately, however, such approaches either do not provide the controlled targeted removal, require an external heat source (i.e., do not employ a self-propagating reaction), or need complex equipment/processes while lacking portability.

Induction of corrosion reactions to remove metals are highly dependent on the substrate material along with time, temperature, and reactant concentration. Furthermore, the presence of surface passivation layers on alloys (e.g., $Cr_2O_3$ on stainless steels) can slow corrosion reactions significantly until such barriers to the underlying substrate are penetrated. Consequently, corrosion is often induced via immersion of a material in corrosive media (e.g., molten salts) over long time scales.

The ability to achieve rapid metal removal over a localized area with a portable device design would be advantageous for applications where more efficient targeted removal of a targeted material is desirable.

Electrorefining is an electrolytic reaction that oxidizes the components of an alloy at the anode and reduces those same components at the cathode, thus transferring the materials between the electrodes. Electrorefining processes are used extensively to both extract metals from their ores and to refine metals to a higher purity. Electrorefining can be carried out in molten salt, in which case the material to be purified or refined must be immersed in a salt mixture heated above its respective melting point. Such a procedure requires the use of an external and continuous heat source (e.g., furnace) to maintain the salt in a liquid state. Furthermore, the removal of targeted material in conventional electrorefining processes is not highly localized, as the material to be purified functions as the anode and the overall objective is extraction or purification.

What is needed in the art are approaches for the targeted removal of metals, such as those utilized in nuclear cladding applications. Also needed are systems for carrying out the operations. Such systems and methods could facilitate operations pertaining to nuclear fuel analysis and reprocessing, among other beneficial uses.

SUMMARY

According to one embodiment, disclosed is a system for localized removal of a metal from an area of a substrate. The system includes an enclosure, a eutectic salt, a thermite, an ignition material, and an electric circuit, the electric circuit including a first electrode, a second electrode, and a power supply. The enclosure is configured to retain the eutectic salt in contact with the metal or metal alloy of the substrate, the first electrode is configured for electrical contact with the eutectic salt within the enclosure, the second electrode is configured for contact with the substrate, and the power supply is configured for application of a voltage between the cathode and the anode.

According to one embodiment, disclosed is a method for localized removal of a metal from an area of a substrate. The method includes locating a eutectic salt on an area of a substrate that includes the metal. A thermite is located in thermal communication with the eutectic salt, and an ignition material is located in thermal communication with the thermite. The method includes igniting the ignition material, upon which the ignition material ignites the thermite, and the eutectic salt becomes molten from the heat produced by the thermite. The method also includes locating a first electrode and a second electrode in electrical communication with the eutectic salt and the area of the substrate and applying a voltage across the area of the substrate and the molten salt, upon which at least a portion of the metal migrates from the first electrode to the second electrode according to an electrolytic reaction

BRIEF DESCRIPTION OF THE FIGURES

A full and enabling disclosure of the present subject matter, including the best mode thereof to one of ordinary skill in the art, is set forth more particularly in the remainder of the specification, including reference to the accompanying figures in which.

Repeat use of reference characters in the present specification and drawings is intended to represent the same or analogous features or elements of the present invention.

DETAILED DESCRIPTION

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment, may be used in another embodiment to yield a still further embodiment.

The present disclosure is generally directed to methods and systems for carrying out rapid and significant localized material removal through controlled and targeted electrorefining approaches. Methods utilize controllable self-sustaining electrolytic electrorefining reactions and can be carried out by use of inexpensive, readily available salt compositions. Beneficially, disclosed methods and systems can be utilized to remove metallic material from underlying substrates, for instance in targeted cladding removal.

The methods beneficially utilize a self-propagating exothermic reaction to cause rapid melting of a salt mixture to form a eutectic molten salt, and thereby induce highly localized electrorefining reactions for the removal of a metallic material (e.g. a metal or a metal alloy) from a targeted location of a substrate. The methods allow for highly localized material removal without the need for a continuous external heat source. Furthermore, the electrode setup can be small, lightweight, and constructed as a single unit, thereby facilitating swift and simple deployment to a location as needed.

In the discloses processes, a self-propagating reaction is initiated to reach high temperatures sufficient to induce localized melting of a salt mixture situated on a substrate that includes a metal or metal alloy. Using a power supply connected to an electrode assembly, an electrolytic reaction capable of generating a well-controlled amount of metal removal can be carried out. Metal removal can be controlled so as to provide limited or significant metal removal (i.e., corrosion), as desired. For instance, metal removal can be limited to a particular depth of a surface material, through the entire depth of a surface material (with little or no corrosion of an underlying substrate material), through the entire depth of one layer and partial depth of an underlying layer, or through the entire depth of multiple layers of a multi-layer composite, e.g., a surface coating as well as an underlying substrate to form a hole through a multi-layer composite, etc.

The system can beneficially provide physical constraint to the surface area affected by the electrorefining process. In some embodiments, the system can be a portable, single unit. The developed system can thus provide a route by which targeted material can be rapidly and controllably removed from a structure, and in one embodiment from the surface of a substrate, according to an electrorefining methodology.

Electrorefining involves the use of an electrolytic reaction to oxidize metal, e.g., one or more components of an alloy, at an anode and simultaneously reduce metal at a cathode, thus transferring material between the electrodes. The disclosed techniques are based on fundamental principles of electrochemistry, and allow for localized electrorefining utilizing self-sustaining reactions and molten halide salts. Disclosed methods and systems can be beneficially employed in a variety of applications. For instance, disclosed methods can enable accelerated corrosion studies in a range of applications. In one embodiment, disclosed methods and systems can be utilized in removal of cladding material of nuclear fuel pellets, e.g., formation of holes in cladding material such as Zr-based alloys, iron-based alloys, Ni-based alloys, Al-based alloys, stainless steel, etc.

Figures 1A, 1B:
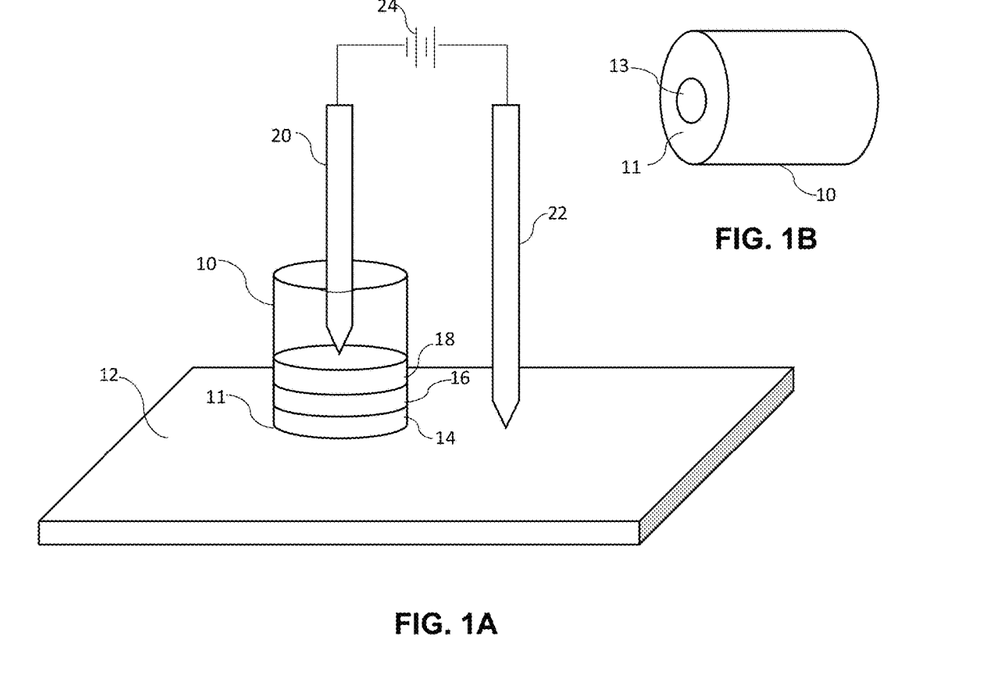
FIG. 1A illustrates one embodiment of a system for carrying out a method as disclosed herein.
FIG. 1B illustrates one embodiment of an enclosure of a system of FIG. 1A.

A schematic of one embodiment of a system as may be utilized in disclosed methods is provided in FIG. 1A. As indicated, the system includes an enclosure 10. that can be localized on an area of a structure 12 that includes one or more metals and/or metal alloys targeted for removal. The enclosure 10 can be formed of any corrosion resistant nonconductive or electrically isolated material including carbon compounds such as electrically isolated graphite or glassy carbon, ceramics such as alumina, silicon carbide or boron nitride, a corrosion resistant metal alloy, or composite material including carbon and ceramics, or a perfluorinated plastic material, such as a polyfluoroethylene, provided the material can withstand the operating temperatures of the process, as well as combinations of different materials.

The enclosure 10 can be of any convenient size and shape. For instance, while illustrated as cylindrical, the enclosure 10 can optionally have a square, rectangular, or other polygonal cross-sectional shape. The enclosure can include an opening at a first end 11, which can span the entirety of the cross-section of the enclosure 10 or can encompass one or more portions of the enclosure cross-section. For instance, as illustrated in FIG. 1B, the end 11 of enclosure 10 designed for contact with a surface to be treated, can define an opening 13 (or multiple openings) that spans less than the entire cross-sectional area of the enclosure end 11.

Within the enclosure 10, a eutectic salt 14 can be retained, e.g., in a layer as illustrated. The eutectic salt 14 can be located in a layer or any other convenient arrangement, provide that that during use, the salt will contact the area of the structure 12 to be treated.

The eutectic salt 14 of a system is not particularly limited, and can be selected from any electrorefining-capable eutectic salts as are known in the art including, without limitation, a eutectic halide salt such as a chloride salt (e.g., one or more of $KCl$, $MgCl_2$, $NaCl$), a fluoride salt (e.g., one or more of $KF$, $NH_4F$, $NaF$, $RbF$, $MgF_2$, $CaF_2$, $LiF$, $SrF_2$, $CrF_2$, $CrF_3$, $FeF_2$, $FeF_3$), as well as mixtures of different salts. The particular salt or mixture of salts to be used in a protocol can generally depend upon the particular metal to be electrorefined, as is known in the art.

In some embodiments, the eutectic salt 14 can include modifications in relative amounts of different materials, e.g., compositional tunings as well as additives as are known in the art, which can modify one or more aspects of the systems, e.g., limit vaporization of salt and/or improve metal recovery during a process. By way of example, the eutectic salt 14 can include one or more additives such as alkaline agents (e.g., sodium carbonate, sodium hydroxide, potassium hydroxide, potassium carbonate, etc., or mixtures thereof) and/or a fluoride source (e.g., MF, $MF_2$, $MAlF_4$, $M_3AlF_6$, in which M comprises sodium or potassium, or mixtures thereof), which can improve coalescence of a metal and improve recovery of a separated metal.

The quantity of the eutectic salt 14 can vary, generally depending on, for example, the composition of the salt 14, the area of the structure to be contacted with the salt 14, the thickness/composition of the underlying metal/alloy, and/or the volume of material to be electrorefined during a protocol.

A system can also include a thermite 16 retained within the enclosure 10. Any thermite that includes a metal powder and metal oxide and that upon ignition undergoes a self-sustaining exothermic redox reaction is encompassed herein. A thermite 16 can include a traditional thermite 16 such as $Al/Fe_2O_3$ or any other thermite (or mixture or composition thereof), and is not limited to any particular thermite. By way of example and without limitation, a thermite 16 can include Al/CuO, Al/NiO, Al/CoO, Al/AgO, $Al/Fe_2O_3$, $Al/Fe_3O_4$, $Al/SnO_2$, or any mixture thereof.

During use of a system, the thermite 16 can be ignited, and the resulting self-propagating reaction can heat the eutectic salt 14 to a temperature well above its melting point. For instance, a $KCl—MgCl_2—NaCl$ eutectic salt as well as typical commercial salts as may be included in a eutectic salt can generally exhibit a melting point around 400° C. Thus, any thermite 16 that exhibits a suitably high adiabatic temperature capable of melting the eutectic salt 14, can be included in a system.

Figure 2:
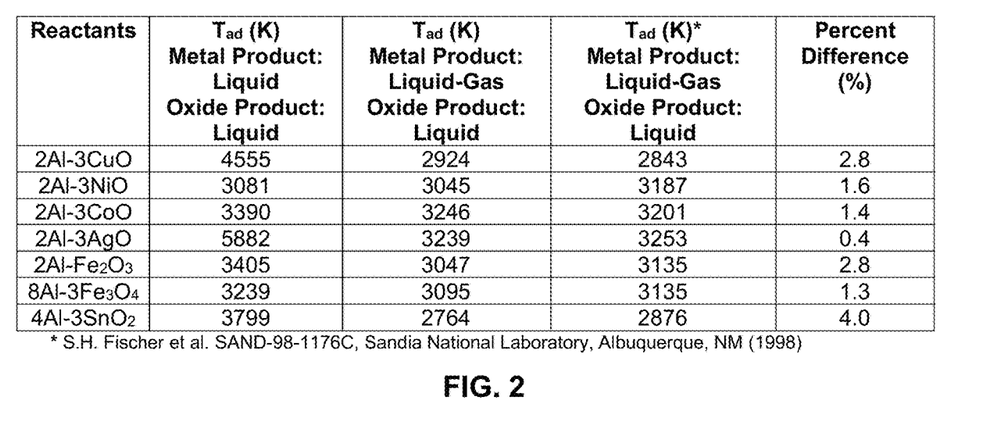
FIG. 2 presents a table including derived adiabatic temperatures for different thermite mixtures and comparison with previously published data.

In developing the particular materials for a system, the adiabatic heats of reaction for metal/metal oxide thermite pairings can be calculated based on thermodynamic properties along with a comparison to literature data for the different reactions. For example, thermodynamic modeling of a plurality of known thermites was carried out, results of which are shown in FIG. 2. The modeling ascertained adiabatic temperatures of the thermite mixtures when considering phase changes for reaction components as can be expected to be carried out with an electrorefining system as disclosed. As indicated, the calculated adiabatic heats of reaction were within 10% of the literature values, clearly illustrating that the adiabatic heats of reaction from thermodynamic properties of thermites can be used as a valid estimate of the heat released by the reaction for modeling heat transfer in the disclosed systems.

In developing a system, the thermodynamic properties of a single thermite or a group of thermites of interest can be utilized in determination of a eutectic salt to be utilized in any particular embodiment. Likewise, a eutectic salt of interest can be corresponded with a thermite of interest (or a composition thereof) according to heat transfer models in selection of specific materials for use in a system.

The type and/or quantity of a thermite 16 can be determined through consideration of the thermite reaction period, which can control the temperature and molten state duration of the salt. In some embodiments, a thermite 16 can include one or more additives, which can modify a characteristics of the thermite 16. For instance, in one embodiment, a thermite reaction period and/or adiabatic temperature of a thermite 16 can be modified through addition of additives such as barium nitrate (as in thermate), and/or through introduction of an external oxygen source to the reaction site. For instance, the oxygen can be fed to the interior of the enclosure 10 during a protocol and thereby modify the thermodynamic properties of the thermite reaction. Such an approach can in one embodiment extend the duration period of the molten phase of the eutectic salt 14 and thus extend the electrolytic reaction period. Through control of reaction period for the electrorefining process, the process can be controlled so as to, e.g., enhance localized corrosion of thicker substrates (e.g., greater than about 1.5 millimeters) or encourage corrosion of a substrate that includes materials resistant to the electrorefining process.

Additives to a thermite 16 can be utilized to modify one or more characteristics of a system, e.g., limit vaporization of the salt, control the thermite reaction pressure, peak temperature, reaction rate, etc. For instance, the inclusion of a metal oxide (which can be the same metal oxide of the thermite or a different metal oxide) can moderate the reaction period, for instance, to slow the reaction rate and thereby increase the molten state duration period of the eutectic salt and thus the electrolytic reaction period. By way of example, stoichiometric aluminum/iron oxide thermite reaches a nominal peak temperature of 2965° C., inclusion of additional aluminum oxide powder to the thermite as an additive can lower the peak reaction temperature, e.g., to less than 1700° C., which can decrease vaporization of the eutectic salt and increase the electrolytic reaction period. Other known additives, such as calcium peroxide, can likewise be utilized to lower the ignition temperature of a thermite.

In addition to a eutectic salt 14 and a thermite 16, an enclosure 10 can retain an ignition material 18. An ignition material 18 can include any material that can ignite the thermite 16, thereby melting the eutectic salt 14 of the electrorefining reaction. An ignition material 18 can include one or more reactants that upon reaction can provide a suitable heat of reaction to ignite the thermite. An ignition material 18 can be provided in an enclosure 10 as a layer, as illustrated. Alternatively, an ignition material 18 can be provided so as to merely contact the thermite 16 at a limited contact area suitable to ignite the thermite.

In one embodiment an ignition material 18 can include magnesium. For instance an ignition material can be in the form of a magnesium ribbon that can contact the thermite 16. A magnesium ribbon ignition material 18 can be directly ignited by a user or can be indirectly ignited, as by a secondary fuse, and thereby ignite the thermite 16. Ignition by use of a magnesium ribbon can be both reliable and desirable when quick ignition is desired.

Alternatively, a magnesium powder can be utilized as an ignition material 18. For instance, a layer of a magnesium powder can be located within an enclosure, and the magnesium powder ignition material 18 can be ignited by use of a suitable fuse or the like.

In one embodiment, an ignition material 18 can include multiple reactants that exhibit an exothermic reaction, the heat of reaction of which is suitable to ignite the thermite 16. In one embodiment, the ignition material 18 can include glycerin and potassium permanganate ($KMnO_4$). As the glycerin contacts the $KMnO_4$, the oxidizing properties of the permanganate ion leads to a highly exothermic reaction with the glycerin and releases suitable heat (e.g., temperatures greater than about 2,000° C.) to ignite the thermite 16. Upon ignition of the thermite 16, the eutectic salt 14 will melt and, under an applied electric potential, induce localized corrosion of the targeted material according to an electrolytic reaction. Thermite ignition by use of an exothermic reaction of, e.g., $KMnO_4$ and glycerin reaction, can provide additional variation in reaction times and conditions.

In one embodiment, an ignition material 18 that functions via exothermic reaction of two (or more reactants) can be utilized with a first reactant of the ignition material 18 held within the enclosure 10, e.g., a layer of $KMnO_4$ and a second reactant added to the enclosure 10 to instigate the protocol. Upon addition of the second reactant, e.g., glycerin, to the enclosure 10, and contact between the two, the exothermic reaction of the ignition material 18 can proceed. In another embodiment, multiple reactants can be retained within the enclosure and a secondary reaction can be utilized to bring the reactants into contact with one another. For instance, a first reactant, e.g., $KMnO_4$, can be separated from a second reactant, e.g., glycerin, by use of a soluble polymer such as in the form of a separating film, encapsulation of one of the reactants in a polymeric structure, or the like. Upon addition of a suitable solvent and the resulting dissolution of the polymer, the reactants can contact one another and the exothermic reaction can occur. Alternatively, the reactants of the ignition material 18 can be in contact with one another while held within the enclosure 10, and the exothermic reaction can be initiated through modification of an environmental parameter, e.g., temperature.

An ignition material 18 can include multiple materials that exhibit multiple exothermic reactions, for instance so as to provide improved ignition control to a system. For example, an ignition material 18 can provide a first ignition reaction, and that first ignition reaction can ignite a second ignition reaction, which in turn can ignite the thermite 16. In one such embodiment, a system can include both a magnesium ignition material and a $KMnO_4$/glycerin ignition material. Upon contact of glycerin with $KMnO_4$ retained in an enclosure 10, a first ignition reaction can take place that can then ignite the magnesium in a second ignition reaction. The second ignition reaction can provide suitable heat of reaction to ignite the thermite 16. Different components of a multi-component ignition material 18 can be provided within an enclosure 10 in separate sub-layers or mixed together, as desired, with a particular arrangement of the materials generally depending upon the nature of the particular reactions.

Beneficially, the ignition material 18, the thermite 16 and the eutectic salt 14 utilized in a system can be tailored for the metal(s) of the structure 12 and volume of the metal(s) that is to be removed from the targeted area by a process. For instance, the adiabatic heat of reaction of the thermite ignition reaction of the ignition material 18 can be modified through selection of specific ignition materials, selection of amounts of materials, etc. to control the reaction rate and adiabatic temperature produced from the thermite 16. The thermite 16 can likewise be selected to provide a particular reaction rate and adiabatic temperature. This in turn can then be utilized to control the temperature of the eutectic salt 14 and the duration period of the molten state of the salt.

Referring again to FIG. 1A, the electrorefining system can include a cathode 20 and anode 22 in conjunction with a power supply 24 to establish an electric circuit between the molten eutectic salt 14 and the structure 12, with the load being defined by the specific reaction at the electrodes 20, 22. By way of example, and without limitation, the open circuit voltage at the cathode 20 can be about 0.5 volts or more than the open circuit voltage at the anode 22, such as about 1 volt or more than the open circuit voltage at the anode 22 in some embodiments. The voltage potential established across the system during an electrolytic reaction process can generally be about 2 volts or greater, or about 2.5 volts or greater, in some embodiments. Of course, the kinetic losses and ohmic losses that will occur during operation of a device can affect the voltage across the system, as can the specific design, configuration, electrode material, molten salt of choice, intermediates, etc., as is known.

The electrodes 20, 22 can be formed of a suitable high-temperature material that can function at the reaction conditions, e.g., a tungsten or tungsten alloy (e.g., tungsten-rhenium) electrode, or another high temperature alloy such as platinum-iridium or platinum-rhodium alloys.

In some embodiments the system can include a lead that can provide an electrical connection from the structure 12 providing contact with the anode 22 to the cathode 20. For instance, the lead can be a carbon, metal, or other conductive element that can be in electrical contact with the structure 12.

Optionally, the system can include an electronic load control element. When present, an electronic load control element can include a potentiostat as is generally known in the art. In general, a potentiostat can include an operational amplifier in a feedback control configuration in which the potential of a reference electrode is controlled relative to the system's working electrode. The potentiostat can also include control mechanisms as are known in the art to prevent damage to the system components should the preset reference voltage become substantially different from the input voltage across the cell.

The present disclosure may be better understood with reference to the Examples set forth below.

Example

Portable electrolysis cells were constructed and electrorefining experiments with thermate-TH3 mixtures and KCl—$MgCl_2$—NaCl salts on stainless steel substrates were conducted. Proof-of concept was successfully demonstrated, and holes were produced in stainless steel under an applied potential of 2.5 V. Compositional analysis revealed a loss of Cr from the substrate near the formed hole, as is consistent with passivation layer destabilization and Cr removal in chloride salts.

In this example, the mixing of $KMnO_4$ and glycerin initiated an exothermic reaction capable of igniting both Mg and a thermite mixture; Mg powder was employed to ensure consistent and uniform ignition of the thermite. Heat released upon ignition of the thermite melted salt placed in contact with the substrate from which material was to be removed. With the application of a potential between the cathode and anode (the latter of which was in electrical contact with the substrate), the electrorefining reaction capable of generating significant corrosion was initiated at a targeted substrate location.

The thermite formulation used is summarized in Table 1, below.

TABLE 1

| Mass of $Fe_2O_3$ | 5 | g | Thermite | 68.7 | g |
|---|---|---|---|---|---|
| Molar mass of $Fe_2O_3$ | 159.69 | g/mol | $Ba(NO_3)_2$ | 29 | g |
| | | | S | 2 | g |
| Molar mass of Al | 26.98154 | g/mol | Thermite | 0.321549 | mol |
| Mass of Al | 1.68962 | g | $Ba(NO_3)_2$ | 0.110968 | mol |
| Molar mass of thermite | 213.6531 | g/mol | S | 0.062373 | mol |
| Mass of thermite | 6.68962 | g | | | |
| Moles thermite | 0.031311 | mol | | | |
| Molar mass $Ba(NO_3)_2$ | 261.337 | g/mol | | | |
| Moles $Ba(NO_3)_2$ | 0.010805 | mol | | | |
| Mass of $Ba(NO_3)_2$ | 2.823857 | g | | | |

TABLE 1-continued

| | |
|---|---|
| Molar mass of S | 32.065 g/mol |
| Moles S | 0.006074 mol |
| Mass of S | 0.194749 g |
| Mass of thermate-TH3 | 9.708226 g |

*Values provided are mass of components per 100 g thermate-TH3

Figure 3:
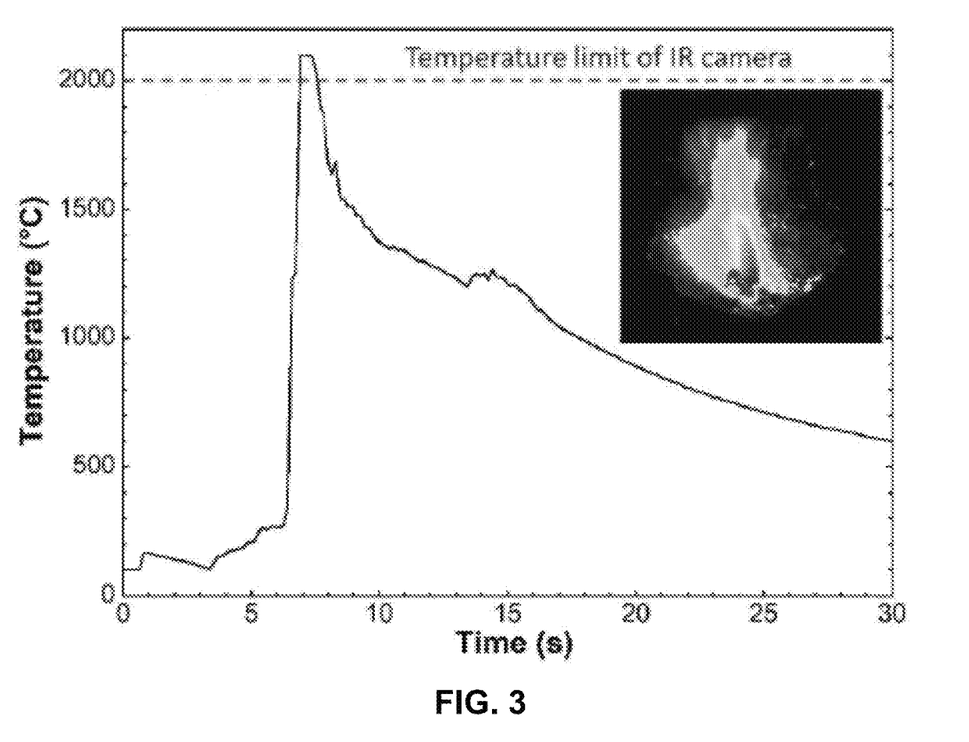
FIG. 3 presents a plot of temperature vs. time recorded with an IR camera upon ignition of a thermate-TH3 material and an inset image captured at peak temperature.

Successfully initiated thermite reactions with different redox mixtures and recorded temperatures>2000° C. (limit of IR camera) were obtained with thermate-TH3 composition containing $Fe_2O_3$/Al, $Ba(NO_3)_2$, and S (FIG. 3); consistent ignition was achieved with glycerin-$KMnO_4$ and Mg powder as ignition sources.

Commercially available KCl—$MgCl_2$—NaCl salt was pre-melted on a 304 stainless steel substrate and allowed to solidify by cooling to room temperature. A thermate-TH3 mixture composed of thermite $Fe_2O_3$/Al, $Ba(NO_3)_2$, and S (with no binder) was pressed into a pellet and placed on the substrate in the region coated with salt. The top of the thermate-TH3 pellet was covered with Mg powder, then $KMnO_4$.

Figure 4:
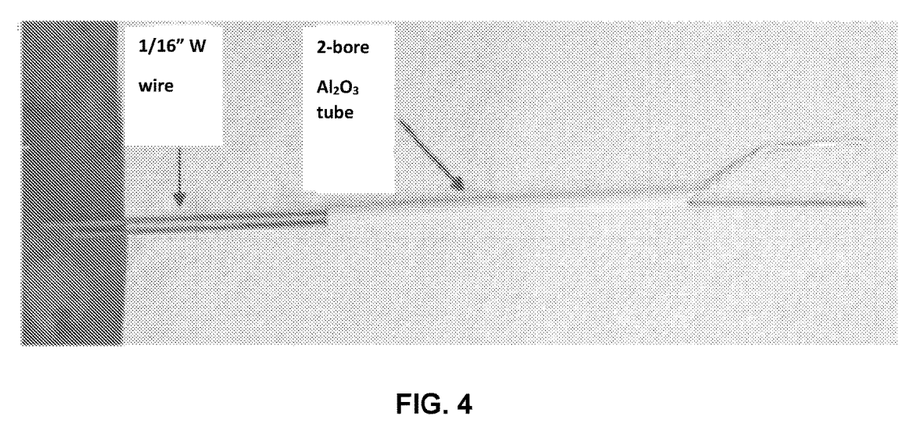
FIG. 4 illustrates an electrode assembly as may be utilized in a method.
Figure 5A:
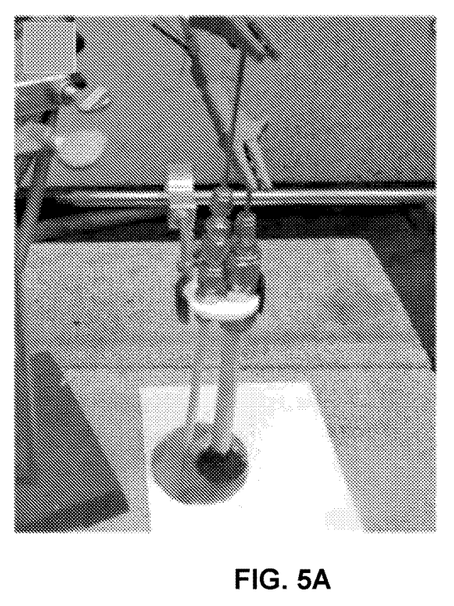
FIG. 5A presents a photograph of a test system including a ⅛" tungsten (W) rod electrode assembly.
Figure 5B:
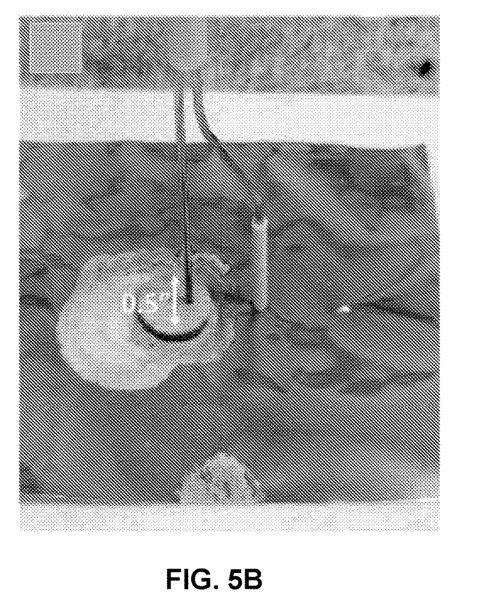
FIG. 5B presents a photograph of another test system including a 1/16" W rod electrode assembly.

Two different cells were constructed to test the localized electrorefining of the stainless steel using the thermite-TH3 and KCl—$MgCl_2$—NaCl salt. The larger cell included 1/8" tungsten rods inserted into 1/4" alumina tubes and secured to an inert spacer with Swagelok fittings and Teflon ferrules (FIG. 5A). A smaller cell was assembled from 1/16" tungsten wire passed through 2-bore alumina tubing (FIG. 4). The resulting cell is illustrated in FIG. 5B.

Figure 6A:
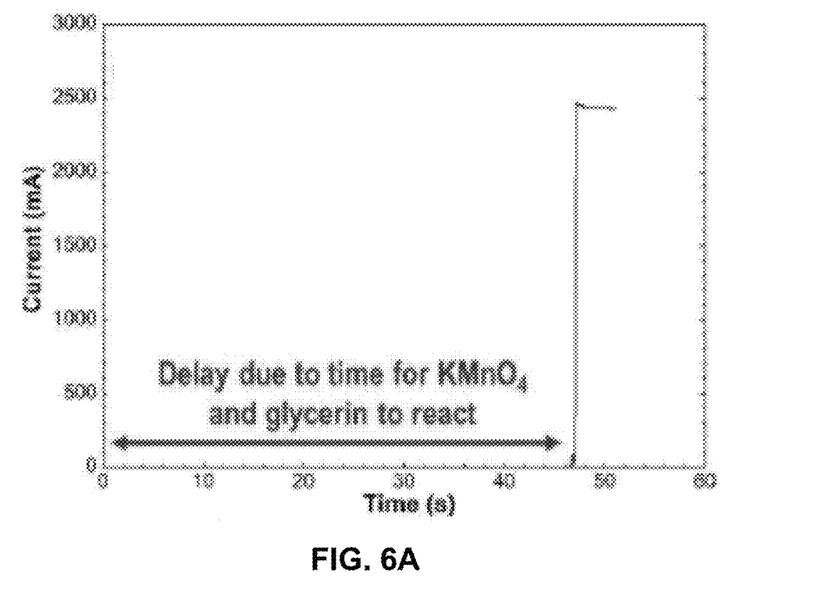
FIG. 6A presents current response with time for a test system measured upon initiation of thermate-TH3 reaction in the presence of a molten salt.
Figure 6B:
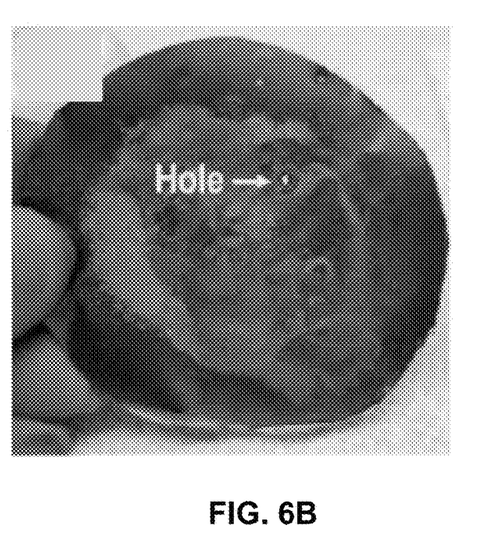
FIG. 6B presents a photograph of a post-test substrate showing the formation of a hole at the location of the W electrode.
Figure 6C:
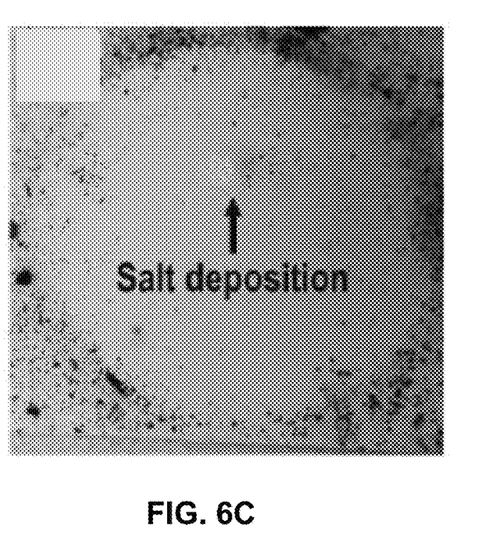
FIG. 6C presents a photograph of a solidified salt deposition on an alumina base plate that was situated underneath the substrate of FIG. 6B, the salt deposition aligns with the site of the hole.
Figure 7:
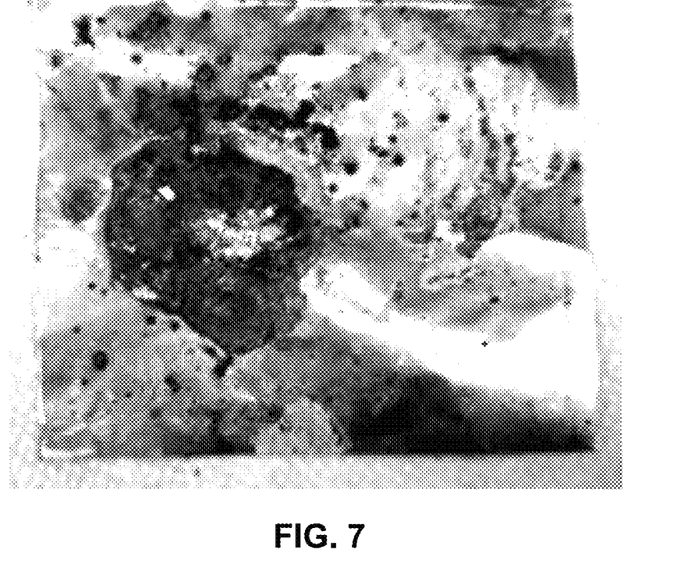
FIG. 7 presents a photograph of a stainless steel substrate following electrorefining according to a process as disclosed herein.

The electrode assemblies including the tungsten rods secured to an insulating spacer were then situated with the cathode on top of the thermate-TH3 and the anode in contact with the bare (i.e., uncoated) substrate. Upon applying a 2.5 V potential across the electrodes, glycerin was added dropwise to the $KMnO_4$. After a brief delay, a reaction between the $KMnO_4$ and glycerin ensued, followed by ignition of the thermate-TH3. The current response, as measured with a potentiostat, exhibited a large increase to a maximum of almost 2.5 A after ignition of the thermate-TH3. Proof-of-concept was successfully demonstrated with both cell designs under the applied potential of 2.5 V A significant increase in current to greater than 2 A was measured upon initiation of the thermite reaction and melting of the salt (FIG. 6A). Visual inspection of the stainless steel substrate revealed the formation of a hole at the location of the tungsten electrode; solidified salt was also observed on the alumina base plate beneath the substrate at the site of the hole (FIG. 6B, FIG. 6C, FIG. 7).

Figure 8:
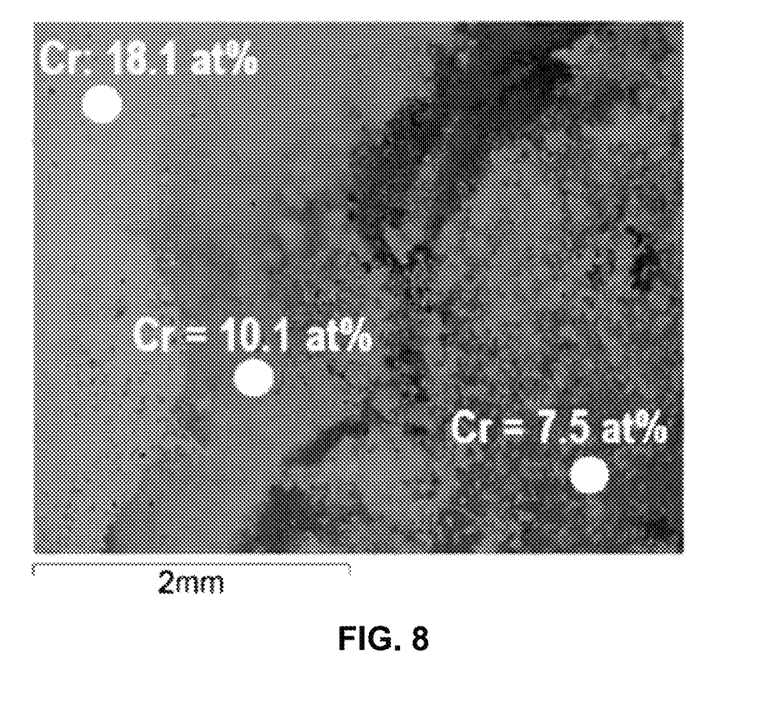
FIG. 8 presents a scanning electron microscope (SEM) image of a post-refining stainless steel substrate showing the location of energy-dispersive X-ray spectroscopy (EDX) point scans and the Cr content measured at the locations; data from the upper left portion of the image were consistent with bulk stainless steel, while the bottom right region of the image is closer to the hole produced from the electrorefining reaction.

Post-test analysis showed a nearly 60% decrease in the Cr concentration (from 18.1 at % to 7.5 at %) on the substrate surface closer to the site of the hole produced by the reaction. Such a finding is consistent with known phenomena regarding the destabilization of $Cr_2O_3$ passivation layers on alloys in chloride salts followed by a subsequent loss of Cr. SEM images and associated EDX data showed Cr depletion on the substrate surface closer to the reaction location (FIG. 8)

While certain embodiments of the disclosed subject matter have been described using specific terms, such description is for illustrative purposes only, and it is to be understood that changes and variations may be made without departing from the spirit or scope of the subject matter.

What is claimed is:

1. A system for localized removal of a metal from an area of a substrate, the system comprising:
   an enclosure;
   a eutectic salt;
   a thermite;
   an ignition material;
   an electric circuit comprising a first electrode, a second electrode, and a power supply; wherein
   the enclosure is configured to retain the eutectic salt in contact with the metal of the substrate, the first electrode is configured for electrical contact with the eutectic salt within the enclosure, the second electrode is configured for contact with the substrate, and the power supply is configured for application of a voltage between the cathode and the anode.

2. The system of claim 1, the ignition material comprising one or more reactants.

3. The system of claim 2, the reactants comprising glycerin and a permanganate.

4. The system of claim 1, the ignition material comprising magnesium.

5. The system of claim 1, the eutectic salt comprising one or more chloride salts, one or more fluoride salts, or a combination thereof.

6. The system of claim 1, the thermite comprising aluminum and a metal oxide.

7. The system of claim 6, the metal oxide comprising an iron oxide.

8. The system of claim 1, the thermite comprising one or more additives.

9. The system of claim 1, the enclosure comprising a ceramic, an electrically isolated graphite or glassy carbon, a corrosion resistant metal alloy, or a perfluorinated plastic.

10. A method for localized removal of a metal from an area of a substrate comprising:
    locating a eutectic salt on an area of a substrate, the area comprising the metal;
    locating a thermite in thermal communication with the eutectic salt;
    locating an ignition material in thermal communication with the thermite;
    igniting the ignition material, the ignition material igniting the thermite, upon which the eutectic salt becomes molten;
    locating a first electrode and a second electrode in electrical communication with the eutectic salt and the area of the substrate; and
    applying a voltage across the area of the substrate and the molten salt, upon which at least a portion of the metal migrates from the first electrode to the second electrode according to an electrolytic reaction.

11. The method of claim 10, wherein the substrate comprises the metal in a layer of a multi-layer substrate.

12. The method of claim 10, wherein the substrate comprises a nuclear fuel cladding, the method forming a hole in the cladding.

13. The method of claim 10, the step of igniting the ignition material comprising contacting a first reactant of the ignition material with a second reactant of the ignition material.

14. The method of claim 10, the ignition material comprising a first ignition material and a second ignition material, a reaction of the first ignition material causing ignition of the second ignition material, and ignition of the second ignition material igniting the thermite.

15. The method of claim 10, further comprising supplying oxygen to the thermite during the electrolytic reaction.

16. The method of claim 10, wherein the open circuit voltage at the first electrode is about 0.5 volts or more than the open circuit voltage at the second electrode.

17. The method of claim 10, wherein the applied voltage is about 2 volts or greater.

\* \* \* \* \*